(12) United States Patent
Chretien et al.

(10) Patent No.: US 12,385,375 B2
(45) Date of Patent: Aug. 12, 2025

(54) LOAD MANAGEMENT FOR POWER SYSTEMS

(71) Applicant: Halliburton Energy Services, Inc., Houston, TX (US)

(72) Inventors: Alexander Simon Chretien, Houston, TX (US); Glenn Howard Weightman, Duncan, OK (US); Madhur Kohli, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 420 days.

(21) Appl. No.: 17/857,321

(22) Filed: Jul. 5, 2022

(65) Prior Publication Data
US 2024/0011378 A1    Jan. 11, 2024

(51) Int. Cl.
*E21B 43/26*    (2006.01)
*G05B 19/416*   (2006.01)
*H02J 3/14*     (2006.01)

(52) U.S. Cl.
CPC ........ *E21B 43/2607* (2020.05); *G05B 19/416* (2013.01); *H02J 3/144* (2020.01); *G05B 2219/41273* (2013.01)

(58) Field of Classification Search
None
See application file for complete search history.

(56) References Cited

U.S. PATENT DOCUMENTS

| | | | |
|---|---|---|---|
| 10,753,165 B1 | 8/2020 | Fischer et al. | |
| 10,871,045 B2 | 12/2020 | Fischer et al. | |
| 10,982,498 B1* | 4/2021 | Fischer | E21B 7/022 |
| 11,156,044 B2 | 10/2021 | Fischer et al. | |
| 11,286,736 B2 | 3/2022 | Fischer et al. | |
| 11,686,186 B1* | 6/2023 | Publes | F04B 49/06 |
| | | | 166/308.1 |
| 2007/0223999 A1* | 9/2007 | Curlett | E21B 43/17 |
| | | | 405/55 |
| 2015/0129210 A1* | 5/2015 | Chong | F28D 21/00 |
| | | | 166/57 |
| 2016/0252071 A1* | 9/2016 | Phillips | H02M 7/066 |
| | | | 290/50 |
| 2020/0056466 A1* | 2/2020 | Mazrooee | E21B 43/26 |
| 2022/0042385 A1* | 2/2022 | Fischer | H02J 13/00036 |
| 2022/0074295 A1* | 3/2022 | Lonnes | E21B 43/263 |
| 2022/0113702 A1* | 4/2022 | Jaaskelainen | G05B 19/416 |
| 2022/0178235 A1* | 6/2022 | Zhang | F04B 47/02 |

(Continued)

*Primary Examiner* — Hua Lu
(74) *Attorney, Agent, or Firm* — John Wustenberg; Parker Justiss, P.C.

(57) ABSTRACT

This disclosure presents processes for controlling a hydraulic fracturing operation at a wellbore. The processes can determine power available from each of one or more individual power sources. From the determined power available from the power sources, parasitic power losses, existing power consumed by one or more loads of the hydraulic fracturing operation, a threshold power level, or a combination thereof, the processes can determine an incremental power available to the one or more loads. The processes communicate the incremental power available to the one or more loads. The hydraulic fracturing operation is then controlled by processes based on the incremental power available to the one or more loads.

23 Claims, 4 Drawing Sheets

(56) References Cited

U.S. PATENT DOCUMENTS

| | | | |
|---|---|---|---|
| 2023/0228177 A1* | 7/2023 | Zhang | G05B 13/021 |
| | | | 417/1 |
| 2023/0228178 A1* | 7/2023 | Converse | F04B 49/20 |
| | | | 166/308.1 |
| 2023/0235653 A1* | 7/2023 | Publes | E21B 44/00 |
| 2023/0312251 A1* | 10/2023 | Bowlin | B65G 65/32 |

* cited by examiner

LOAD MANAGEMENT FOR POWER SYSTEMS

BACKGROUND

In the oil and gas industry, a well that is not producing as expected may need stimulation to increase production of subsurface hydrocarbon deposits, such as oil and natural gas. Hydraulic fracturing is a type of stimulation treatment that has long been used for well stimulation in unconventional reservoirs. A stimulation treatment operation may involve drilling a horizontal wellbore and injecting treatment fluid into a surrounding formation in multiple stages via a series of perforations or entry points along a path of a wellbore through the formation. During each stimulation treatment, different types of fracturing fluids, proppant materials (e.g., sand), additives, and/or other materials may be pumped into the formation via the entry points or perforations at high pressures and/or rates to initiate and propagate fractures within the formation to a desired extent. Other well servicing equipment is needed to assist with the well stimulation equipment in order to successfully produce hydrocarbons from these unconventional reservoirs in a subsurface formation.

SUMMARY OF THE DISCLOSURE

In one aspect, a method to control a hydraulic fracturing operation at a wellbore is disclosed. In one embodiment, the method includes (1) determining power available from each of one or more individual power sources; (2) determining an incremental power available to one or more loads of the hydraulic fracturing operation based on the determined power available from each of the one or more individual power sources, parasitic power losses, existing power consumed by the one or more loads, a threshold power level, or a combination thereof; (3) communicating the incremental power available to the plurality of loads; and (4) controlling the hydraulic fracturing operation at the wellbore based on the incremental power available.

In a second aspect, a computer program product having a series of operating instructions stored on a non-transitory computer-readable medium that cause at least one processor to perform operations to control a hydraulic fracturing operation at a wellbore is disclosed. In one embodiment, the operations include (1) determining power available from each of one or more individual power sources; (2) determining an incremental power available to one or more loads of the hydraulic fracturing operation based on the determined power available from each of the one or more individual power sources, parasitic power losses, existing power consumed by the one or more loads, a threshold power level, or a combination thereof; (3) communicating to the one or more loads the incremental power available; and (4) controlling the hydraulic fracturing operation at the wellbore based on the incremental power available.

In a third aspect, a system to control automated fracturing operations at a wellbore is disclosed. In one embodiment, the system includes one or more processors to perform one or more operations. In one embodiment, the one or more operations include (1) determining power available from one or more individual power sources; (2) determining an incremental power available to one or more loads of the hydraulic fracturing operation based on the determined power available from the one or more individual power sources, parasitic power losses, existing power consumed by the one or more loads, a threshold power level, or a combination thereof; (3) communicating to the one or more loads the incremental power available; and (4) controlling the hydraulic fracturing operation at the wellbore based on the incremental power available.

BRIEF DESCRIPTION OF THE DRAWINGS

Reference is now made to the following descriptions taken in conjunction with the accompanying drawings, in which.

DETAILED DESCRIPTION

To enable the fracturing fluids to fracture the formation, a large amount of electric power is required to drive pumping units that can create the pressures needed to fracture the subsurface formation with the fracturing fluids. Many times these pumping units are driven by, e.g., variable frequency drives. These pumping units can be located at a surface above the formation typically proximate to a wellbore(s) at a well site.

This electric power can come from various sources. The various sources of electric power can fall into two general categories: locally generated power and grid (or utility) power. Examples of locally generated power can be generators (or gensets) that are typically powered by natural gas turbines or diesel engines (however they can be generated by other means) or other types of locally generated power. Either of these sources of electric power cannot be considered as an infinite source. Locally generated power or utility generated electric power (typically conveyed to the well site by conventional transmission means) is limited based on the power source(s) and is subject to being depleted by the pumping units or other loads, including but not limited to blending equipment, wireline equipment, wireline pump-down pumps, control vans, water transfer equipment, sand handling equipment, etc.

These loads, without mitigation, can call for more electric power than is currently available from the power sources. This can, left unchecked, result in voltage sags or, worse, power interruption which can end pumping operations and other servicing operations. Certain aspects and features of the present disclosure relate to source power limits as a boundary to constrain the amount of power requested by the various loads to source power that is available to the various loads. The source power availability is communicated to the various loads which is then used, typically by a control system, to limit the power called for by the loads, thereby, in some cases, limiting a flow rate of the fracturing fluid provided by the pumping units. This reduces the risk of power related shutdown of hydraulic fracturing operation. Such a shutdown could be minor in effect or significant. A significant shutdown can result in a long amount of non-productive time, equipment damage, and/or expensive rentals of remediation equipment.

Figure 1:
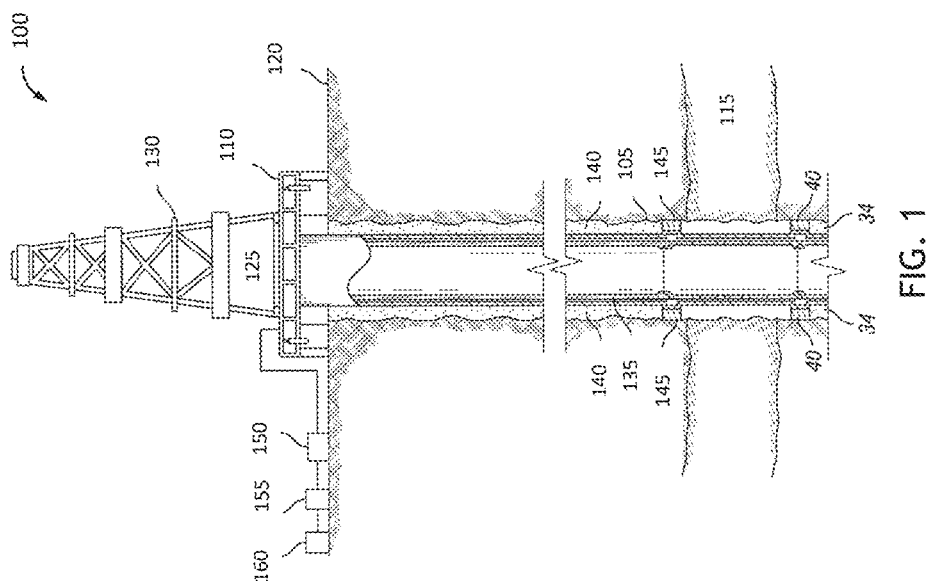
FIG. 1 illustrates an example schematic of a wellbore stimulation and servicing environment.

FIG. 1 is a schematic diagram of a wellbore stimulation and servicing environment 100 for transferring material in and for production of material from a wellbore 105. Generally, wellbore stimulation and servicing environment 100 illustrates a system for transferring material from a surface-located hydrocarbon well site 110. The well site 110 is located over a hydrocarbon bearing formation 115, which is located below a ground surface 120. At certain times during the management and operation of the wellbore stimulation and servicing environment 100, the well site 110 may comprise a hoisting apparatus 125 and a derrick 130 for raising and lowering pipe strings, such as a work string, drill string or any other mechanism for deploying downhole tools, such as a bottom hole assembly, a drill bit, or sensors. While well site 110 is illustrated at a ground surface 120, the disclosure contemplates any one or more embodiments implemented at a well site at any location, including, at sea above a subsea hydrocarbon bearing formation.

Site equipment 150 receives power from power distribution unit 155. Power distribution unit 155 may comprise various types of power equipment, devices, or mechanisms. In one or more embodiments, power distribution unit 155 may receive power from a power aggregation unit (not shown) that aggregates power sources comprising one or more turbines, generators (for example, an electric generator, a gas generator, a diesel generator, or any combination thereof—also not shown). In one or more embodiments, power distribution unit 155 may be used to source power to any one or more other types of equipment located at or about the well site 110 or the wellbore stimulation and servicing environment 100. Each type of power source connected through, e.g., a power aggregation unit to distribution unit 155, has associated one or more known, published, or otherwise available ratings, settings, parameters or any other operating condition that identifies the optimal operating state for the power source. For example, one or more parameters associated with the operation of a power source connected to power distribution unit 155 through a power aggregation unit may include, but are not limited to, fuel type, fuel consumption, fuel quality, environmental parameters (for example, elevation, barometric pressure, temperature, humidity or other environmental condition), rated driving power, watts, voltage, amps, altitude, sound, size, rated power, rated speed, load capacity, or any other operating condition. In one or more embodiments, one or more of the environmental parameters or factors may be retrieved using a global positioning system (GPS) or weather service (for example, an on-line weather service or portal). In one or more embodiments any of the one or more parameters may be received, determined or otherwise collected in real-time.

The site equipment 150, the power distribution unit 155, or any combination thereof may be controlled by one or more or more control systems, represented by control system 160. Control system 160 may be deposed or positioned at or about the well site 110 or the wellbore stimulation and servicing environment 100. In one or more embodiments, control system 160 may be located remote from the well site 110. Regardless of the location, control system 160 may comprise one or more instructions or software programs stored on a non-transitory computer-readable medium that when executed perform one or more embodiments of the disclosure. For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Control system 160 may include various types of computing devices, including, but not limited to, handheld mobile devices, tablets, notebooks, laptops, desktop computers, workstations, mainframes, distributed computing networks, and virtual (cloud) computing systems. In addition to the functions described above, the control system 160, site equipment 150, or a combination thereof can be configured to perform or direct operation of the illustrative systems and methods described herein. For example, the system for controlling a hydraulic fracturing operation 400, such illustrated in FIG. 4, or the method 300 of FIG. 3 can be implemented at least in part by control system 160, site equipment 150, or a combination thereof.

Figure 2:
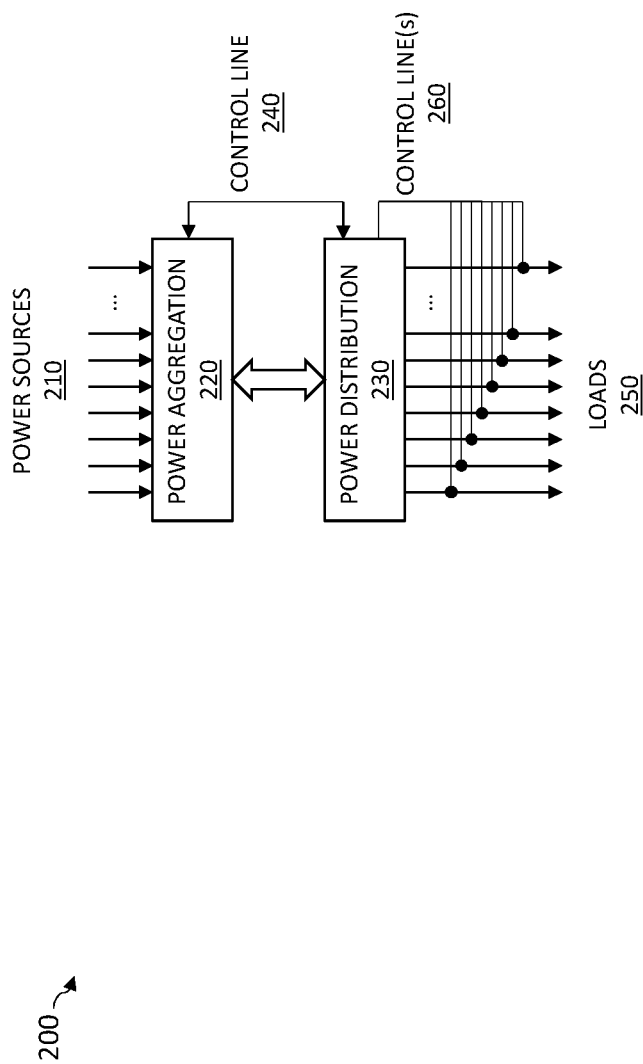
FIG. 2 illustrates a schematic of a system to aggregate power from sources and distribute power to loads to control a hydraulic fracturing operation.

FIG. 2 is a schematic of a system 200 system to aggregate power from sources and distribute power to loads to control a hydraulic fracturing operation at a wellbore such as that described above and depicted in FIG. 1. Individual power sources 210, such as those described above (i.e., multiple gensets, grid/utility feeds, and/or static power sources such as a battery or fuel cell), provide their power to power aggregation unit 220. In some embodiments, only one individual power source provides power. Note that power aggregation is needed when more than one individual power source 210 is used. An example of power aggregation unit 220 can be switchgear equipment. Each of the individual power source 210 provides a Source Power Available (SPA) to the power aggregation unit 220. The aggregate power of the power sources 210 can be described as a Gross Power Available (GPA), such that:

$$GPA = \Sigma_{i=1}^{n} SPA_n \qquad \text{Eq. 1}$$

Where n is the number of power sources 210 and the GPA is the aggregate power applied to power aggregation unit 220.

Any individual $SPA_n$ and resulting GPA is not necessarily a constant over time. For example, any individual $SPA_n$ for a corresponding given individual one of the power sources 210 may be a function of altitude (air pressure), temperature, humidity, fuel source, etc. and thus may vary over the course of time. An algorithm can be used to estimate power available from such sources. Similarly, power from the grid can vary with time of day as other off-site loads come on and offline. An algorithm based on past history or a line voltage can be used to estimate a $SPA_n$ generated by individual grid power sources of the power sources 210. A component, such as a transformer or a cable, may be part of any of the individual power sources 210 and have a power rating that varies with temperature. An algorithm that uses temperature can adjust (derate) any individual one of the power sources 210. For example, one such algorithm that can be used for temperature adjustments is a linear derating algorithm.

Conversely, any of the individual power sources 210 may have a fixed value for its SPA, e.g., 2.5 MW, which does not vary significantly enough to have to be tracked as a live value (e.g., using an algorithm that uses temperature to derate). In some cases, all of the individual power sources 210 may have an essentially fixed power availability SPA in which case the GPA may be a constant value.

In a configuration where the GPA is the sum of many dynamic power sources 210, the value of the GPA will change with changes of available power from those power sources 210. For example, consider ten individual power sources 210 that contribute 1 MW each to the GPA produced by power aggregation unit 220. If all ten individual power sources 210 are online, then the GPA of the power aggregation unit 220 would be 10 MW. However, if, e.g., one of the ten 1 MW individual power sources 210 were to drop offline, then the GPA of the power aggregation unit 220 would be 9 MW.

In many cases the SPA R for a corresponding given individual one of the power sources 210 can be constrained by some equipment limit. For example, a grid power source of the power source 210 may have 20 MW of power available but conductors used for that grid power source may limit usable power to 10 MW. More completely:

$$GPA = \min(SPA_1, ER_1) + \min(SPA_2, ER_2) + \ldots + \min(SPA_n, ER_n) \qquad \text{Eq. 2}$$

where SPAR is the power available from an individual one of the power sources 210 without equipment considerations and ER is an equipment rating for the corresponding individual one of the power sources 210. Further, as noted above, the power provided by each of the individual power sources 210 is a function of various factors, such as represented by Equation 3:

$$SPA_n = f(\text{pressure, temperature, voltage, etc.}). \qquad \text{Eq. 3}$$

The GPA aggregated by power aggregation unit 220 is provided to power distribution unit 230 (e.g., power distribution unit 155 described above). An example of power distribution unit 230 can be switchgear equipment. However, power generation parasitic loads created by the power aggregation unit 220 can reduce the power that can be provided to power distribution unit 230. These power generation parasitic loads may include, e.g., cooling fans, control systems, electric pumps, battery chargers, lights, etc. As such, power available downstream to power distribution unit 230 must consider these power generation parasitic loads. The power available downstream to power distribution unit 230 from power aggregation unit 220 can be termed Net Power Available (NPA) such that:

$$NPA = GPA - \text{power generation parasitic loads} \qquad \text{Eq. 4}$$

In some embodiments, power aggregation unit 220 will communicate a specific GPA, NPA, or both to power distribution unit 230 via control line 240. Communication over control line 240 can be in any protocol or format, e.g., digital data protocols or analog signaling protocols. However, in other embodiments, power distribution unit 230 can employ techniques to determine the GPA, NPA, or both provided by power aggregation unit 220 without control line 240.

As with power aggregation unit 220, power distribution unit 230 also can create power distribution parasitic loads which can, in turn, reduce the power that can be provided to loads 250 (e.g., site equipment 150 described above). In some embodiments, only one load 250 occurs in the hydraulic fracturing operation. These power distribution parasitic loads of power distribution unit 230 may also include, e.g., cooling fans, control systems, electric pumps, battery chargers, lights, etc. As such, power available to downstream to loads 250 can consider these power distribution parasitic loads of power distribution unit 230. The power available downstream to loads 250 can be termed Power Available (PA) such that:

$$PA = NPA - \text{power generation parasitic loads} - \text{fixed loads} - \text{live loads} \qquad \text{Eq. 5}$$

Here, PA is defined differently than NPA and GPA in that the intent is to convey the power available for an incremental load increase. This is sometimes referred to as a "power reserve." The term "fixed load" in Eq. 5 above can be thought of as load capacity set aside for a safety margin or some specific purpose such as a critical load that must remain online. The term "live loads" in Eq. 5 above are loads regularly placed on the power distribution system, e.g., loads 250.

In some embodiments, as with power aggregation unit 220, power distribution unit 230 will communicate a live load-specific individual PA to live loads 250 via control line(s) 260. Communication over control line(s) 260 can be in any protocol or format, e.g., digital data protocols or analog signaling protocols. However, in other embodiments, a live load-specific individual PA is not communicated to loads 250.

Consider a fracking example below.
Assume NPA is fixed at 20 MW;
Assume power distribution parasitic loads are 0.5 MW;
Assume that a fixed load of 1.5 MW is applied.
Thus, PA=20 MW−0.5 MW−1.5 MW=18 MW to the live loads.

If the live loads total 18 MW, then PA=0. This means that the live loads cannot increase any without causing a system overload in some fashion. If the live loads are 17 MW, e.g., then an incremental increase of 1 MW is available to the live loads.

Typically, the above-described incremental power availability is a metric used to control hydraulic fracturing at a wellbore so that a power related shutdown of a hydraulic fracturing operation does not occur. By limiting the power called for by the loads of the hydraulic fracturing operation to the incremental power availability, the power related shutdown of the hydraulic fracturing operation can be avoided. There are several techniques that can be employed to utilize the incremental power availability described above.

In one embodiment, live loads can intercommunicate to utilize the incremental power availability. Using an algorithm, the live loads can distribute, e.g., targets of load reduction (e.g., power shedding) or of incremental power availability. For example, assume there are ten live loads connected to and calling for power from power distribution unit 230 that has an NPA of 12 MW. Assume the power distribution parasitic loads are 0.5 MW and the power reserve (or fixed load) is 1.5 MW. If each live load calls for 1 MW each, the resulting PA would be approximately 0. Assume a PA target of 0.5 MW. Given the current PA is zero, there is a shortfall between the PA and the PA target and a reduction of power called for by the individual live loads (power shedding) would need to be reduced. Here, the algorithm could divide the PA target by the number of loads and require each live load to reduce their call for power by 0.05 MW (0.5 W divided by loads). One way to implement this would be for each live load intercommunicate the number of live loads online, the current PA, and the target PA. Then, each live load could independently perform the above calculation and reduce its call for power by 0.05 MW (each live load reducing its power call from 1.0 MW to 0.95 MW).

In this embodiment, the live loads could also intercommunicate when a PA is above a target PA to utilize incremental power availability. Using the same example above, except that power distribution unit 230 has an NPA of 17 MW (and assuming the same power distribution parasitic loads of 0.5 MW, power reserve of 1.5 W, and PA target of 0.5 MW), there is not a shortfall as described above but, rather, an excess of incremental power available of 5 MW (17 MW-1.5 MW-0.5 W-10 MW aggregate existing power calls for the ten live loads) to the ten live loads. In this case, each load would independently perform the above calculation and increase its call for power by 0.5 MW (each live load increasing its power call from 1.0 MW to 1.5 MW).

In another embodiment, a central processor could be used to utilize the incremental power availability. Each live load could communicate with a central processor its call for power. The central processor would implement an algorithm using, e.g., the calculations above, to either delegate load sheds to the individual live loads (i.e., each live load would reduce its call for power based on the amount delegated by the central processor) when the PA is less than the PA target or delegate calls for increased power when the PA is above the PA target. Of course, the central processor could employ a different algorithm based on different inputs and objectives. For example, a different objective would be to delegate load sheds or delegate calls for increased power based on an importance of a specific load. An example of this different objective would be that a blender (a specific live load) may be deemed more important than a single pumping unit (a different specific live load). Therefore, in this scenario, power to the blender would be shed last when delegating load sheds.

Further, the central processor could determine a different amount of power to be called for (either an increase or decrease) for different individual live loads. In other words, the central processor could delegate a differing power call for different individual live loads and each live load would call for a different amount of power from power distribution unit 230. Of course, even when different live loads call for differing amounts of power from power distribution unit 230, the overall aggregate amount of power called for by the individual live loads (e.g., loads 250) would be governed by the algorithm (e.g., the algorithm described above).

In this embodiment, the central processor could be a plurality of processors. All or portions of the central processor (or plurality of processors) could be located in a same or different locations. For example, all or portions of the central processors (or plurality of processors) could be located with power aggregation unit 220, power distribution unit 230, loads 250, site equipment 150, power distribution unit 155, control system(s) 160, etc.

In another embodiment, the live loads could unilaterally manage a change in call for power. Consider the above example (ten loads each calling for 1 MW each—10 MW total—with a PA near zero). In this embodiment, each live load could recognize the low PA itself and reduce its call for power such that the PA returns to a desirable level. Each live load could employ an algorithm that would determine a speed and magnitude of change in power call for that live load with a goal of not introducing any power oscillations. The means of an increase or decrease in calls for power are somewhat dependent on the nature of the load calling for the power. For example, for hydraulic fracturing operations, load shedding (decrease in the call for power) usually means reducing a speed of something, typically a pumping unit. If fluid pressure is constant, then power used by a pumping unit (or any other pump) is proportional to the flow rate generated by the pumping unit. Thus, in this case, flow rate would be reduced to decrease a call for power.

An example of this individual unilateral management of power call by each live load, e.g., a pumping unit, is described below.

Calculation Loop:

If PA<LPL then Derate($i$)=Derate($i-1$)+ABS(PA−LPL)*$QDRPL$

IF PA>=LPL then Derate($i$)=Derate($i-1$)−ABS(PA−LPL)*$QDRPL$

Rate Setpoint=Target Setpoint−Derate($i$)

where:
PA=Power Available
LPL=Lower Power Limit (acts as a safety margin)
i=loop index
QDRPL=Increment that flow rate can be adjusted through each processing loop
Derate(i)=cumulative flow rate adjustment
Rate Setpoint=flow rate command to a control system for the pumping unit
Target Setpoint=desired flow rate from the pumping unit, assuming no power limitations The power oscillations noted above could occur since individual live loads would independently change their call for power at the same time. For example, if all of the live loads determined independently that they can increase their call for power (because an aggregate PA above a PA target would allow for an incremental aggregate increase in power) and then call for a power increase at the same time, the aggregate of the power increases for the individual live loads could reduce the PA below the target PA level. Without intercommunication between the live loads or a central processing controlling power calls by the live loads, this could happen. Eventually, each live load would realize the PA is at or below zero and then each live load, independent of each other, would reduce their call for power and the aggregate PA would rise above the target PA. The cycle would start over again because the individual live loads, when realizing the aggregate PA was above the target PA, would again increase their call for power without knowing other live loads were doing the same at the same time. The first two embodiments above (intercommunication between live loads or a central processor controlling power calls by the live loads) would avoid this power oscillation scenario.

The various power available values (e.g., GPA, SPA, NPA, PA, etc.) can be communicated through various systems of the hydraulic fracturing operation. This communication can be accomplished though, e.g., networked digital data, analog signals, or a combination thereof. In one embodiment, the networked digital data can be, e.g., User Datagram Protocol (UDP) packets sent over an Internet Protocol (IP) based network running on, e.g., Ethernet. In another embodiment, an example of analog signals is a 4-20 mA current loop where 4 mA represents one power level and 20 mA represents a higher power level. However, any digital networking protocol or analog signaling protocol could be used to communicate the various power available values between the various systems of the hydraulic fracturing operation.

An example of one configuration of hydraulic fracturing equipment that uses the above elements is described below. Source power would include ten gensets (e.g., power sources 210), each having a power capability ($SPA_n$) of 2.5 MW including all equipment limitations and parasitic losses. Power from the source power would be aggregated in a switchgear (e.g., in power aggregation unit 220). Electronics in the switchgear would determine which gensets are online and assumes that the SPAR is fixed at 2.5 MW each. In this example, it is assumed the power aggregation equipment would have insignificant parasitic loads.

GPA=10*2.5=25 MW for all gensets online

NPA=GPA−0=25 MW

The NPA is communicated to the power distribution unit (e.g., power distribution unit 230) via an analog signal in an interconnecting control cable (e.g., control line 240).

In this example the aggregated power is distributed to loads through another switchgear (e.g., power distribution unit 230). This switchgear has parasitic loads of 0.1 MW. A fixed load of 1.0 MW is set aside for critical equipment. A control system (e.g., control system 160) interprets the NPA analog signal and determines the PA as follows:

$$PA = NPA - \text{switchgear parasitic loads} - \text{fixed load} - \text{live loads}$$
$$= 25 - 0.1 - 1.0 - \text{live loads}$$
$$= 23.9 \text{ MW} - \text{live loads}$$

This PA is communicated to the live loads via an analog signal in multiple interconnecting control cables (e.g., control lines 260).

In this example, eight loads are connected to the power distribution equipment through power cables and the control cables. A control system in each live load interprets the PA analog signal on the interconnecting control cable and uses a unilateral load management algorithm to manage changes in calls for power.

Figure 3:
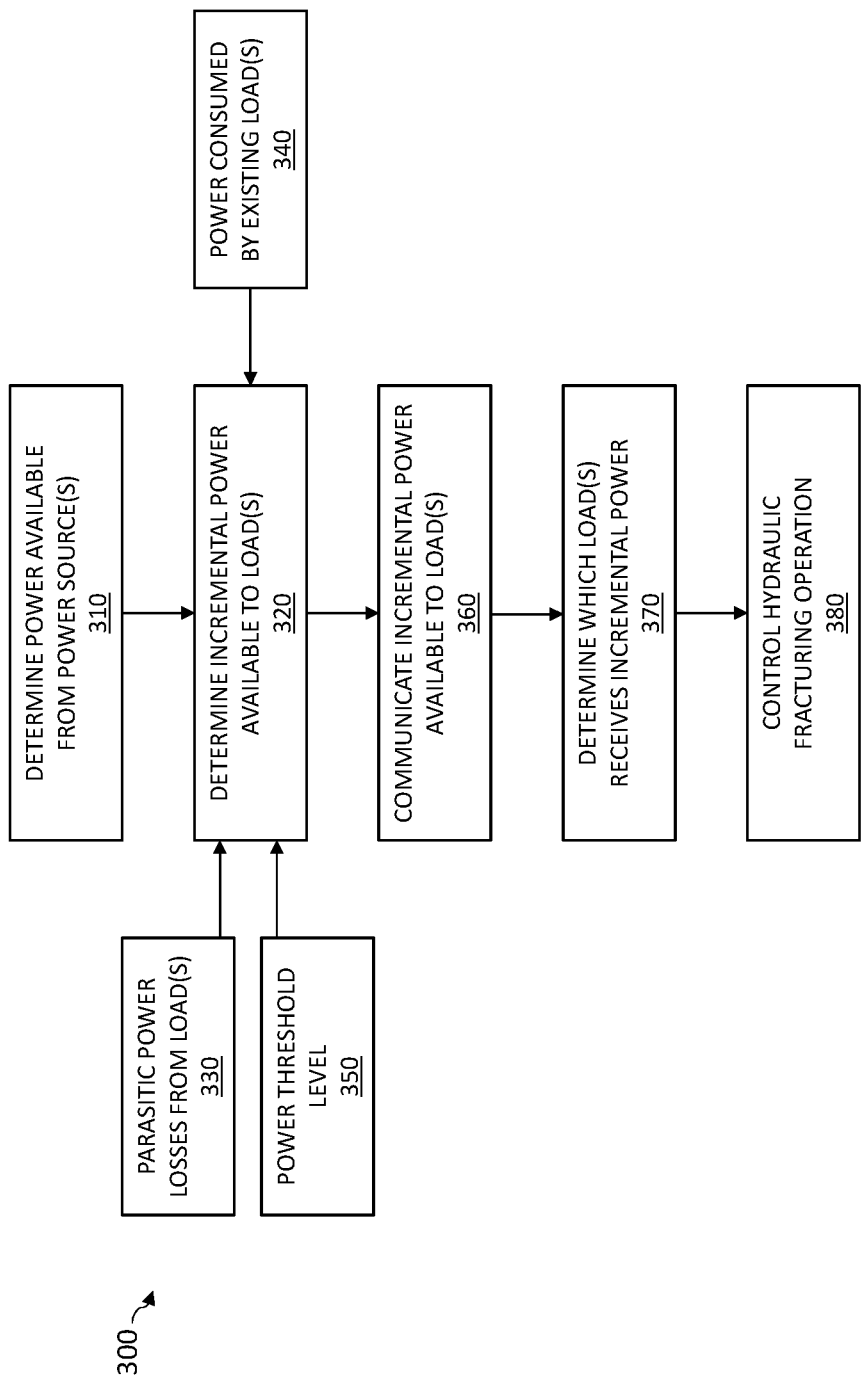
FIG. 3 illustrates a flow diagram of an example for controlling hydraulic fracturing operations according to principles of the disclosure.

FIG. 3 illustrates a flow diagram of an example of a method 300 of controlling hydraulic fracturing operations according to the principles of the disclosure. At least a portion of method 300 can be performed by a system for controlling hydraulic fracturing operations, such as disclosed in FIG. 4. Method 300 starts in step 310 where power available (e.g., SPA) from power sources, e.g., power sources 210, is determined. At step 320, an incremental power available to loads, e.g., loads 250, is determined (e.g., PA as disclosed above). Parasitic power losses are considered in step 330, e.g., the power generation parasitic and power distribution parasitic loads disclosed above. Further, power consumed by existing loads, e.g., live loads 250, are determined in step 340. Yet further, a power threshold level, e.g., the PA target disclosed above, is determined in step 350. These power losses, existing power consumption levels, and power threshold levels from steps 330, 340, and 250 are all considered in step 320 to determine the incremental power available to the loads.

This incremental power available is then communicated to the loads in step 360, e.g., using network digital data protocols or analog signaling protocols as disclosed above and using, e.g., control lines 240/260 as disclosed above. In step 370, a determination is made as to which of the loads receives portions of the incremental power available determined in step 320. This determination can use, e.g., the algorithms disclosed above represented by Equations 1-5 or other algorithms. Once a determination of a specific portion of the incremental power available is made for each load, then that specific load can control the hydraulic fracturing operation in step 380. For example, if a live load is, e.g., a pumping unit, then the determined incremental power available to that pumping unit will be used to adjust the operation of the pumping unit. Thus, e.g., if the incremental power available to that pumping unit is a positive 1 MW, then the pumping unit will increase the flow rate of fracturing fluid being pumped by that pumping unit to use the incremental 1 MW. Or, conversely, e.g., if the incremental power available to that pumping unit is a negative 1 MW (i.e., power shedding), then that pumping unit will reduce the flow rate of the fracturing fluid being pumped by that pumping unit so that that pumping unit consumes 1 MW of power less than that pumping unit was previously consuming. As such, the incremental power available to a specific load controls the hydraulic fracturing operation.

Figure 4:
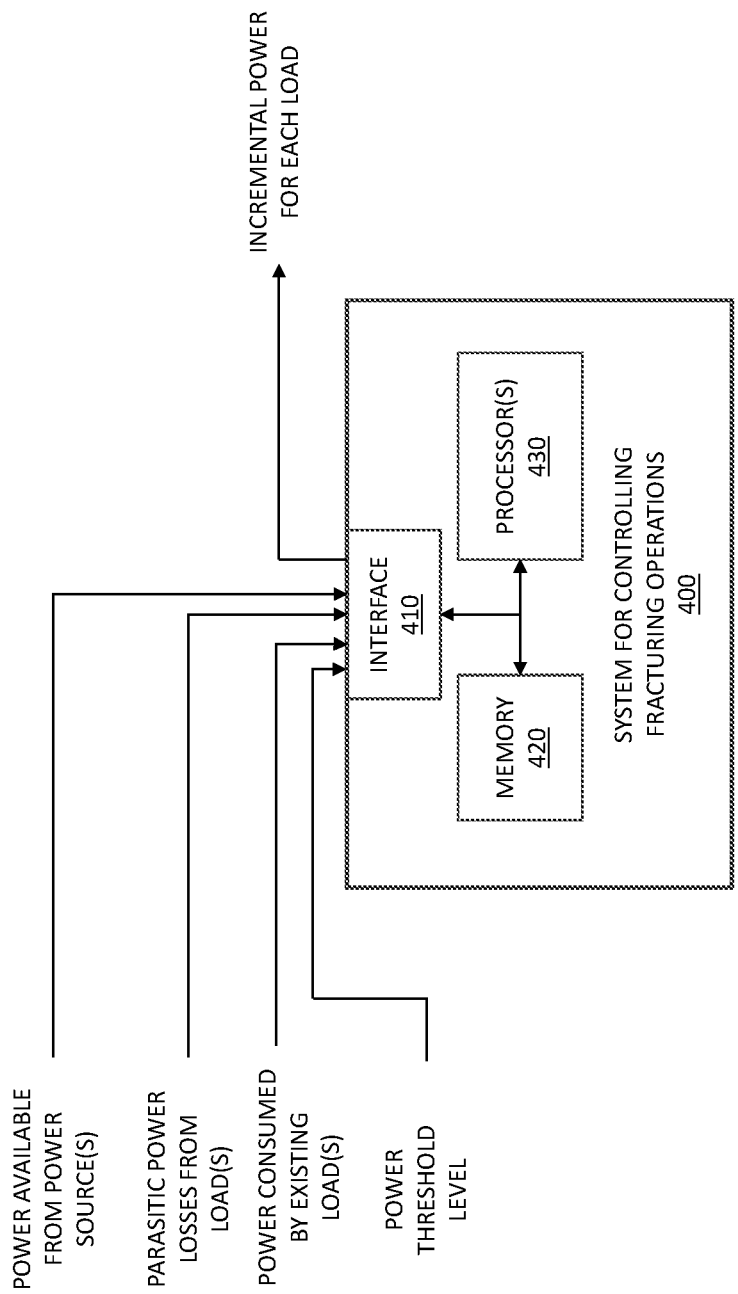
FIG. 4 illustrates a block diagram of an example computing system for use according to the principles of the disclosure.

Computing system 400, illustrated in FIG. 4, provides an example of one or more control systems, such as control systems 160 disclosed above. Computing system 400 can be located proximate a well site, or a distance from the well site, such as in a data center, cloud environment, corporate location, a lab environment, or another location. Computing system 400 can be a distributed system having a portion located proximate a well site and a portion located remotely from the well site. Computing system 400 includes a communications interface 410, a memory (or data storage) 420, and one or more processors 430.

Communication interface 410 is configured to transmit and receive data. For example, communication interface 410 can receive power available from power sources, parasitic power losses from loads, power consumed by existing loads, and a power threshold level during a stimulation operation, e.g., a hydraulic fracturing operation.

Memory 420 can be configured to store a series of operating instructions that direct the operation of the one or more processors 430 when initiated, including code representing the algorithms for determining the incremental power available to specific loads as described above. Code for considering the power available from power sources, parasitic power losses, power consumed by existing loads, and a power threshold during a stimulation operation can also be stored in memory 420. Memory 420 is a non-transitory computer readable medium. Memory 420 can be a distributed memory.

The one or more processors 430 are configured to determine incremental power available to specific loads using, e.g., the algorithms disclosed above in, e.g., Equations 1-5. The one or more processors 430 include the logic to communicate with communications interface 410 and memory 420, and perform the functions described herein.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method to control a hydraulic fracturing operation at a wellbore, the method comprising:
   determining power available from each of one or more individual power sources;
   determining an incremental power available to one or more loads of the hydraulic fracturing operation based on the determined power available from each of the one or more individual power sources, parasitic power losses, existing power consumed by the one or more loads, a threshold power level, or a combination thereof;
   communicating the incremental power available to the plurality of loads; and
   controlling the hydraulic fracturing operation at the wellbore based on the incremental power available.

2. The method of claim 1, wherein at least one of one or more loads of the hydraulic fracturing operation is a pumping unit to move hydraulic fracturing fluid to the wellbore and the controlling the hydraulic fracturing operation is controlling a flow rate of the hydraulic fracturing fluid generated by the pumping unit.

3. The method of claim 1, wherein the power available from at least one of the one or more power sources is dynamic.

4. The method of claim 1, further comprising determining which loads of the one or more loads receive the incremental power available.

5. The method of claim 4, wherein the determination of which loads of the one or more loads receives the incremental power available is based on intercommunication between the one or more loads.

6. The method of claim 4, wherein the determination of which loads of the one or more loads receives the incremental power available is based on a determination made by a central processor.

7. The method of claim 4, wherein the determination of which loads of the one or more loads receives the incremental power available is based on unilateral decisions made by each of the one or more loads.

8. A computer program product having a series of operating instructions stored on a non-transitory computer-readable medium that cause at least one processor to perform operations to control a hydraulic fracturing operation at a wellbore, the operations comprising:
   determining power available from each of one or more individual power sources;
   determining an incremental power available to one or more loads of the hydraulic fracturing operation based on the determined power available from each of the one or more individual power sources, parasitic power losses, existing power consumed by the one or more loads, a threshold power level, or a combination thereof;
   communicating to the one or more loads the incremental power available; and
   controlling the hydraulic fracturing operation at the wellbore based on the incremental power available.

9. The computer program product of claim 8, wherein at least one of the one or more loads of the hydraulic fracturing operation is a pumping unit to move hydraulic fracturing fluid to the wellbore and the controlling the hydraulic fracturing operation is controlling a flow rate of the hydraulic fracturing fluid generated by the pumping unit.

10. The computer program product of claim 8, wherein the power available from at least one of the plurality of power sources is dynamic.

11. The computer program product of claim 8, further comprising determining which loads of the one or more loads receive the incremental power available.

12. The computer program product of claim 11, wherein the determination of which loads of the one or more loads receives the incremental power available is based on intercommunication between the one or more loads.

13. The computer program product of claim 11, wherein the determination of which loads of the one or more loads receives the incremental power available is based on a determination made by a central processor.

14. A system to control a hydraulic fracturing operation at a wellbore, the system comprising:
   one or more processors to perform one or more operations including:
      determining power available from one or more individual power sources;
      determining an incremental power available to one or more loads of the hydraulic fracturing operation based on the determined power available from the one or more individual power source, parasitic power losses, existing power consumed by the one or more loads, a threshold power level, or a combination thereof;
      communicating to the one or more loads the incremental power available; and
      controlling the hydraulic fracturing operation at the wellbore based on the incremental power available.

15. The system of claim 14, wherein at least one of the one or more loads of the hydraulic fracturing operation is a pumping unit to move hydraulic fracturing fluid to the wellbore and the controlling the hydraulic fracturing operation is controlling a flow rate of the hydraulic fracturing fluid generated by the pumping unit.

16. The system of claim 14, wherein the power available from at least one of the one or more individual power sources is dynamic.

17. The system of claim 14, further comprising a power aggregation unit, wherein the one or more individual power sources is aggregated at the power aggregation unit.

18. The system of claim 17, further comprising a power distribution unit wherein power from the power aggregation unit is delivered to the power distribution unit which distributes the power from the power aggregation unit to the one or more loads.

19. The system of claim 18, wherein an aggregate amount of power that can be delivered to the one or more loads is communicated from the power aggregation unit to the power distribution unit via a control line.

20. The system of claim 14, wherein the operations further include determining which loads of the one or more loads receive the incremental power available.

21. The system of claim 20, wherein the determination of which loads of the plurality of loads receives the incremental power available is based on intercommunication between the plurality of loads.

22. The system of claim 20, wherein the determination of which loads of the plurality of loads receives the incremental power available is based on a determination made by a central processor.

23. The system of claim 20, wherein the determination of which loads of the plurality of loads receives the incremental power available is based on unilateral decisions made by each of the plurality of loads.

* * * * *

UNITED STATES PATENT AND TRADEMARK OFFICE
CERTIFICATE OF CORRECTION

| | | |
|---|---|---|
| PATENT NO. | : 12,385,375 B2 | Page 1 of 1 |
| APPLICATION NO. | : 17/857321 | |
| DATED | : August 12, 2025 | |
| INVENTOR(S) | : Alexander Simon Chretien, Glenn Howard Weightman and Madhur Kohli | |

It is certified that error appears in the above-identified patent and that said Letters Patent is hereby corrected as shown below:

In the Specification

In Column 5, Line 10, after --many cases the-- delete "SPA R" and insert --$SPA_n$--

In Column 5, Line 19, after --where-- delete "SPA R" and insert --$SPA_n$--

In Column 5, Line 21, after --and-- delete "ER" and insert --$ER_n$--

In Column 6, Line 55, after --0.05MW-- delete "(0.5 W divided by 10 loads)." and insert --(0.5W divided by 10 loads).--

In Column 8, Line 62, after --assumes that the-- delete "SPA R" and insert --$SPA_n$--

Signed and Sealed this
Twenty-eighth Day of October, 2025

John A. Squires
*Director of the United States Patent and Trademark Office*